3,788,870
XYLOLITH BUILDING BOARDS AND SHEETS
Joachim Zur Verth and Franz Prymelski, Hamburg, Germany, assignors to Joachim Zur Verth, Hamburg, Germany
No Drawing. Filed July 14, 1971, Ser. No. 165,811
Claims priority, application Germany, July 16, 1970, P 20 35 265.2
Int. Cl. C04b 3/00
U.S. Cl. 106—108                        4 Claims

ABSTRACT OF THE DISCLOSURE

Self-supporting, non-combustible xylolith building boards and sheets characterized by their excellent screw retaining capacity and size and shape retention and having a ratio of $MgO:MgCl_2$ of 2:4 composed of a mixture of natural and synthetic magnesite, finely divided wood filler materials and a magnesium chloride solution of 10 to 15° Bé. having a density at the highest of 0.75 g./cm.$^3$ and a weight ratio of MgO:wood shavings and chips of 1:1 to 1:1.15 which has been hardened at a temperature between 30 and 65° C. without pressing.

---

This invention relates to self-supporting, screw-retaining, non-combustible xylolith building sheets and boards characterized by their size retention and freedom from distortion which are particularly suitable for use in the building industry as dividing walls and facing materials.

A great number of processes are already known for manufacturing xylolith boards and sheets in which a mixture of burnt magnesite, organic and/or inorganic fillers and aqueous magnesium chloride solutions are shaped and allowed to harden. In order to produce an adequate degree of setting, the mixtures must contain a weight ratio of $MgO:MgCl_2$ of 2 to 4:1. There have been used as organic filler materials sawdust, wood powder or plant fibers and as inorganic filler materials stone powder, kieselguhr, talc and the like. In order to manufacture a xylolith sheet or board essentially only containing wood-like filler materials the processes up to now have required that 6 parts by volume of magnesite be mixed with 1 to 2 parts by volume of chips or shavings in the dry state and then 4 to 6 parts by volume aqueous magnesium chloride solution of 18 to 23° Bé. be introduced. The resulting mixture is then formed or molded and compressed in the conventional presses. The xylolith sheets or boards prepared in this way have not evidenced a sufficient ability to retain their original measurements and after prolonged periods evidence distortion and warping so that they are unsuitable for most building applications.

In order to avoid these disadvantages, a number of modifications in the manufacture of xylolith sheets and boards have been proposed none of which have to date met with much success.

Thus for example, in German Pat. 808,570 a process is disclosed for manufacturing xylolith sheets and boards in which the mixture of magnesite and fillers has added thereto only that amount of water that the mass thereby formed, before pressing consists of an incohesive pulverulent material and on pressing yields no or only very little fluid. According to this process the wetting liquid supplied constitutes a highly concentrated solution of magnesium chloride (density 1.26 to 1.34 corresponding to 30° Bé. and over) and/or magnesium sulfate (density 1.20 to 1.26). The mixing ratio used of magnesite to filler amounts to 3 to 4:1 and the resultant material is pressed in a press under a pressure of 20 to 40 kg./cm.$^2$ whereby under the pressure the wetting liquid is heated up to boiling. This just described process is, however, very expensive to carry into effect and is capable only of producing xylolith boards and sheets of high density which are not self-supporting or capable of retaining screws.

According to German Pat. 1,160,350 a further process for manufacturing xylolith sheets and boards is described in which the magnesite is mixed with an equal amount by volume of a concentrated magnesium chloride solution (32° Bé.) after which there is introduced into the mixture sawdust which has been saturated with water. The resulting material is introduced into a mold and after hardening the boards removed from the mold and allowed to dry. This process is, however, only suitable for manufacturing xylolith sheets and boards with reduced filler contents and correspondingly higher densities and as a result the finished sheets and boards have a preparation time of only about a month.

For many purposes and in particular in connection with ship construction it is necessary that the sheets or boards remains true to size and that they be capable of holding screws and nails and also that they be non-combustible (DIN 4102).

In accordance with the invention there is now provided a process for manufacturing improved xylolith sheets and boards which avoids the disadvantages of the art and wherein the sheets and boards maintain their dimensions and do not undergo deformation and which at relatively low densities such as associated with natural wood are capable of retaining screws and nails and are simultaneously incombustible.

In accordance with the invention self-supporting non-combustible xylolith building boards and sheets characterized by size and shape retention and by their capacity to retain screws having a weight ratio of $MgO:MgCl_2$ of 2 to 4 are provided by the steps of forming a mixture of natural and synthetic magnesite, finely divided wood fillers and magnesium chloride solution of 10 to 15° Bé., and hardening such mixture at a temperature of between 30 and 65° C. without pressing to form sheets and boards having a density of at the most 0.75 and a weight ratio of MgO:wood chips of 1:1 to 1:1.5.

The xylolith building boards and sheets in accordance with the invention preferably having a density of 0.6 to 0.75 and a weight ratio of wood filler:$MgCl_2$ of 2 to 6 and can additionally contain an amount of inactive kieselguhr at the maximum equal to the amount of magnesite present and/or 0.1 to 0.5 weight percent of a finely divided dispersion of a polymer and/or copolymer containing vinyl acetate, vinyl propionate and/or vinyl alcohols.

The self-supporting non-combustible screw-retaining xylolith building boards and sheets in accordance with the invention are prepared by forming a mixture of burnt magnesite, wood filler and magnesium chloride solution with a weight ratio of $MgO:MgCl_2$ of 2 to 4, molding the resulting mixture and allowing the same to harden. The process is characterized in that a finely divided mixture of natural and synthetic magnesite is mixed with an about 2 to 2.7 fold volume amount of magnesium chloride solution of 10 to 15° Bé. and, with calculated on the magnesite, a 4.5 to 6.2 fold volume amount of finely divided filler so as to form a plastic mass, allowing the same to swell for 45 to 90 minutes then shaping the same in a mold, drying the material while still in the mold for at least 4 hours at a temperature of between 30 and 40° C., removing the formed boards from the mold and drying the same for at least 24 hours at a temperature between 50 and 60° C.

According to a preferred method of the invention 13 volume parts of a mixture consisting of 40 to 60 wt. percent natural and 60 to 40 wt. percent synthetic magnesite are mixed with 25 to 35 volume parts of an aqueous magnesium chloride solution of 10 to 15° Bé. and the resultant mixture then admixed with 60 to 80 volume parts wood chips and/or wood powder having a particle size up to about 5 mm. so as to form a plastic mass. The mass is allowed to swell for about 45 to 90 minutes, the resultant swollen material shaped in a mold to form boards, dried in the mold for about 6 to 10 hours at a temperature of between 35 and 40° C., thereafter removed from the mold and dried for 40 to 50 hours at a temperature of between 50 and 60° C. and the thusly dried boards allowed to dry for several more days at room temperature.

According to another modification of the procedure of the invention, the magnesite is first mixed with the major portion of the magnesium chloride solution and after that the wood fillers introduced and the consistency of the final material adjusted by addition of the balance of the magnesium chloride solution. The thusly recovered plastic material can be rejected from a slot nozzle in the form of flat strands and introduced into a mold which is open at the top and which is maintained under vibration, the surface then smoothed over and the excess material and the shaping or molding advantageously takes place at a temperature between 30 to 40° C. In carrying out the mixing of the magnesite and magnesium chloride, there can before the introduction of the wood filler be introduced in a volume amount, at the most corresponding to the volume of the magnesite, inactive kieselguhr. If there is additionally introduced into the mixture 0.1 to 0.5 wt. percent of a finely divided dispersion of a polymeric or copolymeric material containing vinyl acetate, vinyl propionate and/or vinyl alcohol groups, the material is made hydrophobic and an improved binding achieved.

The xylolith building boards and sheets in accordance with the invention can be worked in the same manner as wood, cemented or glued and lacquered or painted. They are characterized by excellent bending strengths and contain absolutely no health injuring materials. The new building boards can after drying be exposed to high temperatures without undergoing any deformation. In contrast to the known building boards, the building boards in accordance with the invention are entirely finished in a few days and can directly thereafter be utilized for construction purposes.

The following examples are given in order to more fully illustrate the invention and are in no wise to be construed as limited thereby.

EXAMPLE 1

13 liters (9.47 kg.) of a mixture composed of equal amounts by volume of natural and synthetic magnesite (density 0.725 g./cm.$^3$) were mixed together with 28 liters (30.75 kg.) of an aqueous magnesium chloride solution of 13° Bé. (density 1.10 g./cm.$^3$; MgCl$_2$ content 3.25 kg.) and 70 liters (10.25 kg.) of a mixture of equal amounts of wood chips having a particle size of up to 5 mm. and wood powder (density 0.15 g./cm.$^3$) to form a plastic mass. After the mixing had been completed, the mass was allowed to swell for about 50 minutes and then by means of a cement pump and a supply vessel the mixture introduced via a slot nozzle into a plate form or mold which is open at the top.

The surface was smoothed over and the excess material scraped off. The filled mold was kept for 9 hours at 35° C., the board or sheet removed from the mold, kept for 60 hours at 50° C. and for an additional 3 days at room temperature.

The thusly recovered sheet or board measured 244 x 122 x 1.9 cm. and had a weight of 40.7 kg. corresponding to a density of 0.72 g./cm.$^3$. The sheet on storage, after installation and even after exposure to elevated temperature evidenced excellent size retention and absolutely no deformation. The resistance to bending of the sheet amounted to about 170 kg./cm.$^2$ and its screw-holding capacity (Parker screws 6–12 mm.) inserted at a depth of 13 mm. amounted to 110 kg. The sheets can be worked in the conventional manner for wood materials without any difficulty, they can be cemented and treated with coating compositions and paints, particularly for making them moisture-resistant.

The non-combustible nature of the sheets was established according to the procedure described at DIN 4102. In the combustion tests, the sheets exhibited an outstanding heat insulation effect and after a longer exposure to the flame an excellent mechanical resistance.

EXAMPLE 2

Xylolith boards or sheets were prepared by the process of Example 1 but using a mixture of 65 liters of equal parts of wood chips and wood powder and 32 liters magnesium chloride as well as 13 liters of kieselguhr. The mass formed was allowed to swell for about 45 minutes.

The boards formed had the same dimensions and a weight of 39.5 kg. corresponding to density of 0.70 g./cm.$^3$. The bending resistance amounted to 150 kg./cm.$^3$ and the screw-holding capacity at an insertion depth of 13 mm. to 90 kg. The sheets could be worked in the conventional manner with the usual woodworking tools, coated, cemented and painted. The recovered sheets or boards had in comparison to the sheets of Example 1, an essentially greater elasticity. They were not combustible when tested by the procedure of DIN 4102.

EXAMPLE 3

Example 2 was repeated but in this case there was additionally incorporated into the mixture 80 cm.$^3$ of a 50% aqueous dispersion of a vinyl propionate copolymer having a particle size of 0.5 to 3$\mu$. The boards formed from this mixture had a bending resistance of 180 kg./cm.$^3$, a screw-holding capacity at an insertion depth of 13 mm. of 120 kg. and an essentially lowered tendency to take up moisture. When subjected to combustion testing, the boards were characterized by their outstanding heat insulation properties and after prolonged exposure by their excellent flame resistance.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be included within the meaning and range of equivalence of the following claims.

What is claimed as new and desired to be secured by Letters Patent is set forth in the appended claims.

1. A self-supporting screw retaining, non-combustible, fire retardant xylolith building boards and sheets characterized by improved size and shape retention properties complying with the non-combustibility and fire retardant requirements of DIN 4102 comprising a mixture hardened without pressure consisting of burnt natural magnesite, burnt synthetic magnesite, finely divided wood filler materials, and an aqueous magnesium chloride solution of 10 to 15° Bé., said hardened mixture having a weight ratio of MgO:MgCl$_2$ of between 2:1 and 4:1, a weight ratio MgO:wood filler material of between 1:1 and 1:1.5 and a density of at the most 0.75 g./cm.$^3$.

2. Self-supporting, screw retaining, non-combustible, fire retardant xylolith building boards and sheets according to claim 1, wherein said hardened mixture consists of 13 volume parts of 40 to 60% by weight burnt natural magnesite and 60 to 40% by weight of burnt synthetic magnesite, 60 to 80 volume parts of finely divided wood material, 25 to 35 volume parts of an aqueous magnesium chloride solution of 10 to 15° Bé.

3. Self-supporting screw retaining, non-combustible, fire retardant xylolith building boards and sheets according to claim 1 additionally containing inactive kieselguhr in an amount which at the maximum is equal to the content of magnesite.

4. Self-supporting screw retaining, non-combustible, fire retardant xylolith building boards and sheets according to claim 1 having a weight ratio of wood filler:MgCl$_2$ of between 2:1 and 6:1.

References Cited

UNITED STATES PATENTS

| | | | |
|---|---|---|---|
| 827,286 | 7/1906 | Bidtel | 106—108 |
| 1,443,097 | 1/1923 | Sinnett | 106—108 |
| 2,450,258 | 9/1948 | Skolnik | 106—107 |
| 1,752,561 | 4/1930 | Karg et al. | 106—217 |
| 3,317,442 | 5/1967 | Clark | 260—17.4 R |

FOREIGN PATENTS

| | | | |
|---|---|---|---|
| 7,156 | 4/1933 | Australia | 106—108 |
| 6,348 | 6/1889 | Great Britain | 106—108 |
| 10,196 | 7/1892 | Great Britain | 106—108 |
| 517,138 | 1/1940 | Great Britain | 106—108 |

OTHER REFERENCES

Chem. Abst. 50:14195f, Bershtein et al., "Production Xylolite Building Material."

Chem. Abst. 72:35409d, Horley, "Binder Composition For Construct. Material."

Chem. Abst. 64:7842e, Florescu, "Exploitation of Magnesite, Preparation of Xylolith."

Chem. Abst. 72:35329c, Yakovlev, "Xylolith."

Chem. Abst., 45:5388d, Donth, "Xylolite."

WILLIAM H. SHORT, Primary Examiner

E. WOODBERRY, Assistant Examiner

U.S. Cl. X.R.

106—107, 217; 260—17.4 R; 264—122, 123